UNITED STATES PATENT OFFICE.

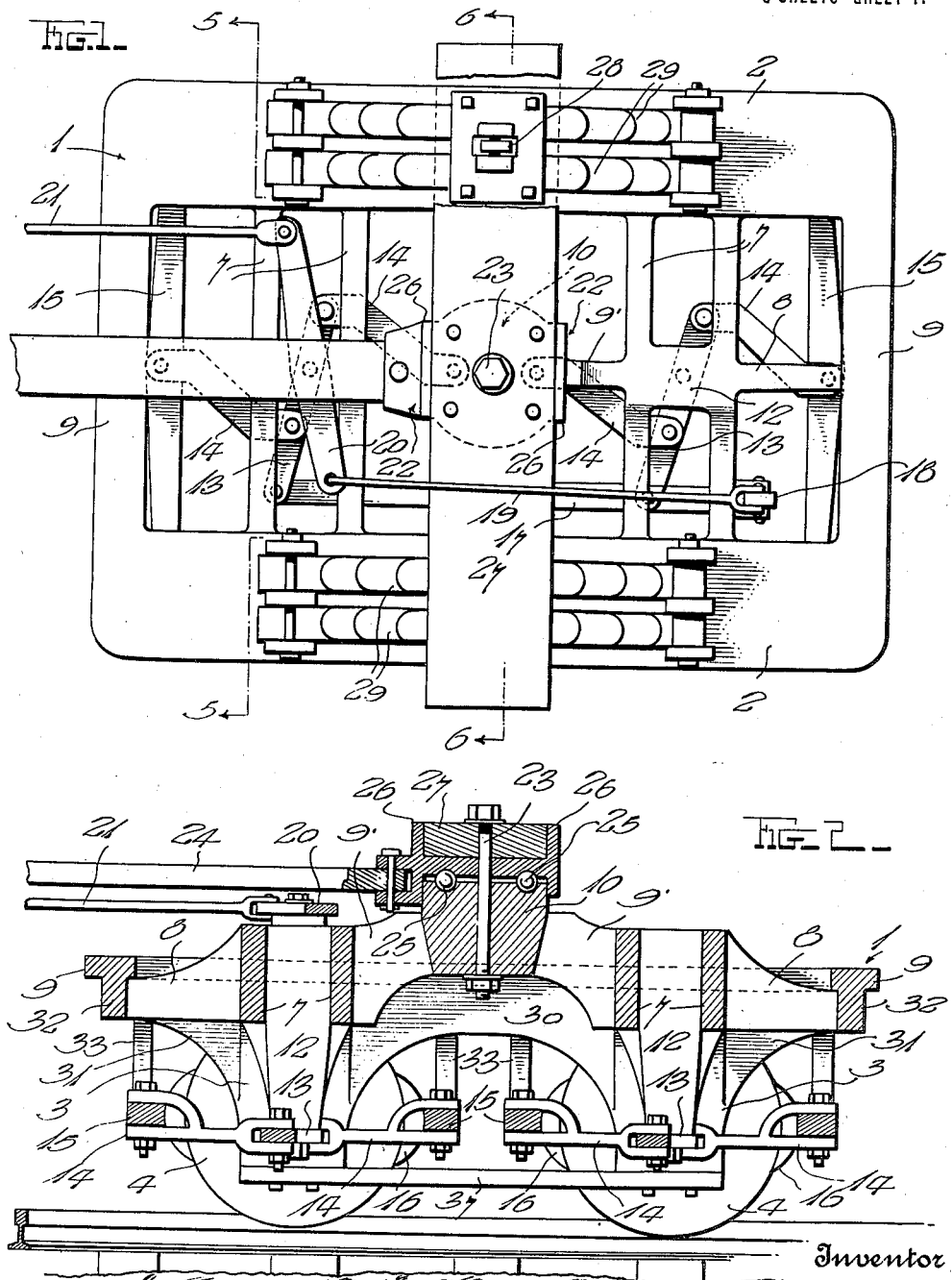

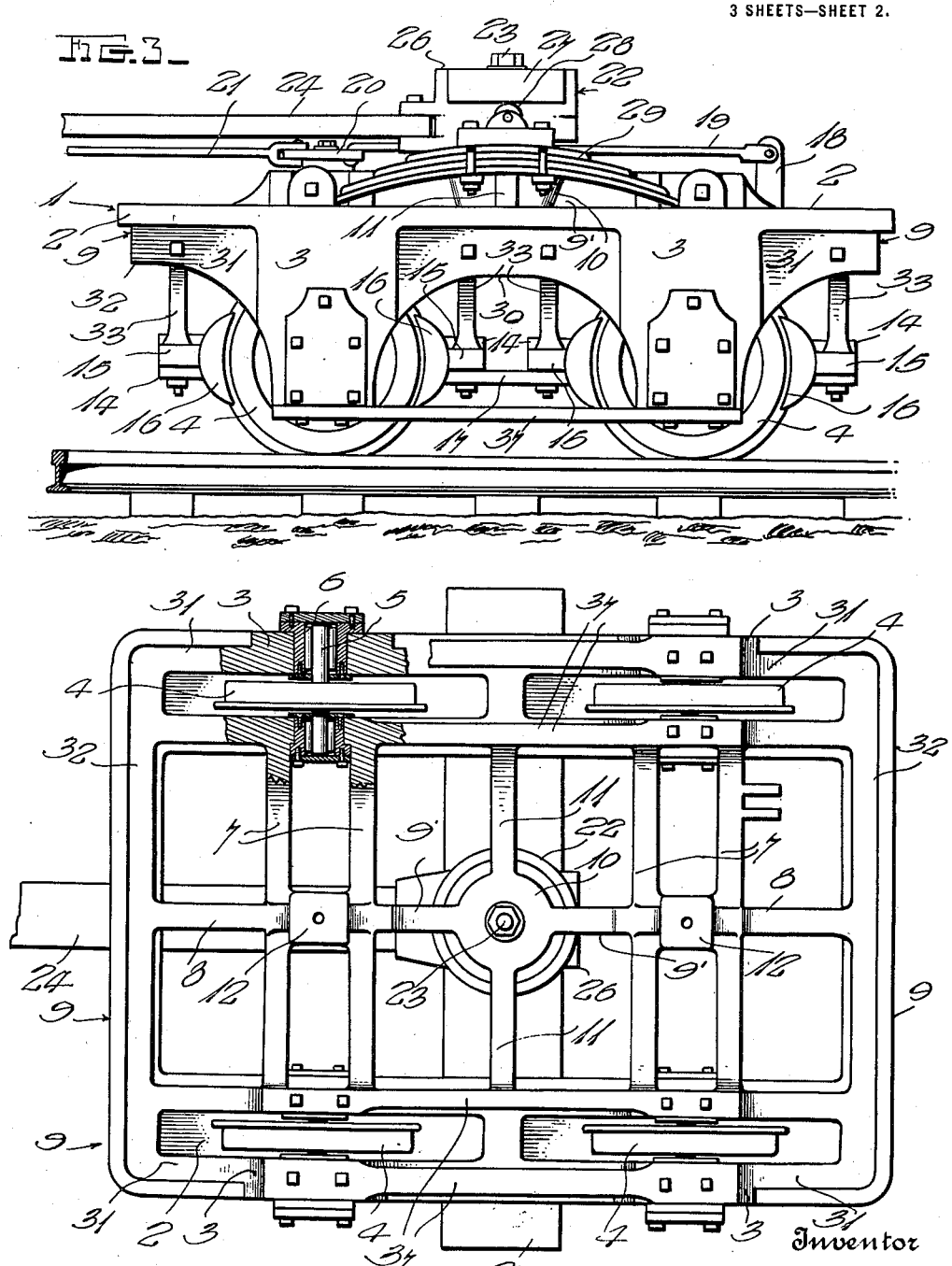

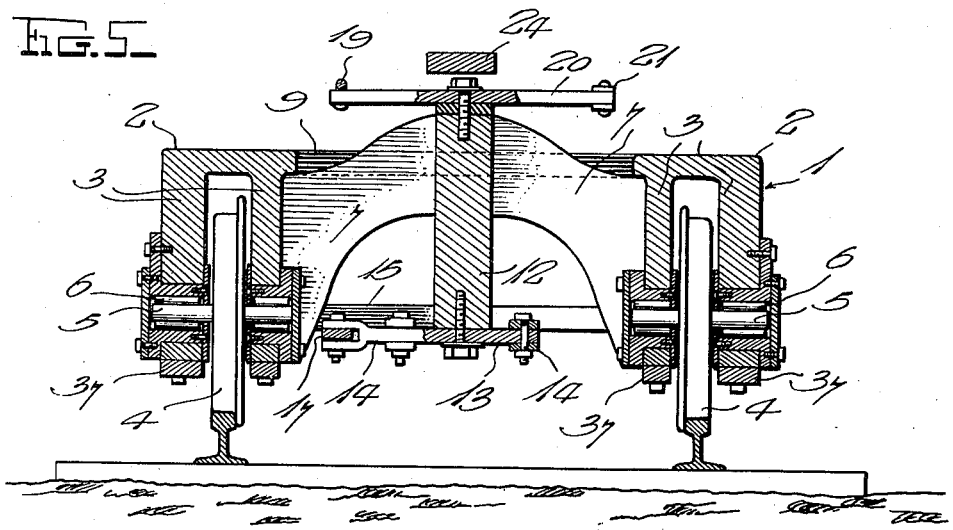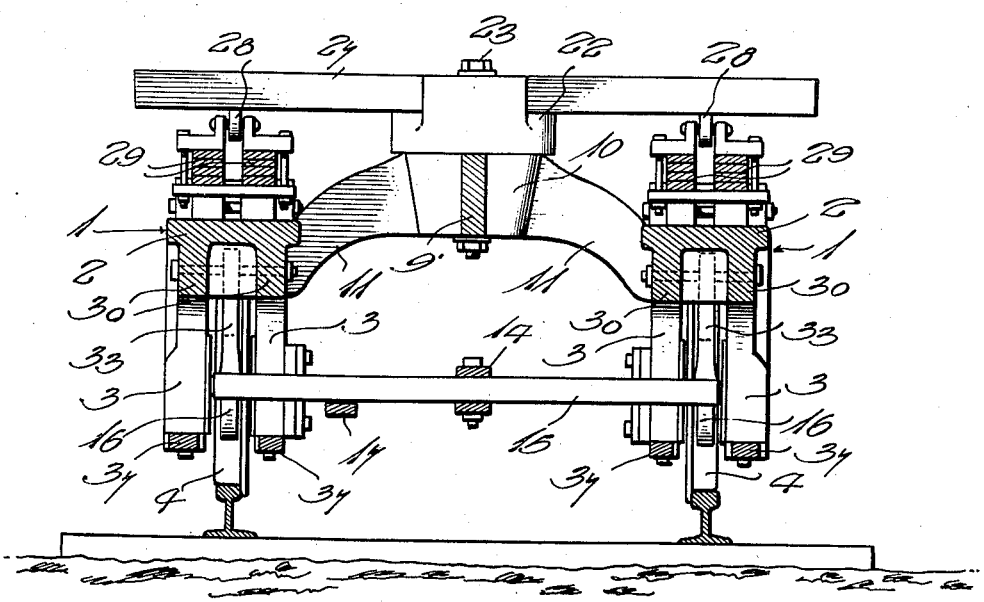

CHANCELOR SIMEON ETHRIDGE, OF CENTER SANDWICH, NEW HAMPSHIRE.

CAR-TRUCK.

1,277,889.   Specification of Letters Patent.   Patented Sept. 3, 1918.

Application filed May 23, 1918. Serial No. 236,147.

*To all whom it may concern:*

Be it known that I, CHANCELOR SIMEON ETHRIDGE, a citizen of the United States, residing at Center Sandwich, in the county of Carroll and State of New Hampshire, have invented certain new and useful Improvements in Car-Trucks; and I do declare the following to be a full, clear, and exact description of the invention, such as will enable others skilled in the art to which it appertains to make and use the same.

My invention has for one of its objects to provide a car truck in which the wheels on opposite sides may turn independently of each other in rounding curves, thus overcoming the necessity of either one set of wheels or the other sliding on the track as is necessary when the usual rigid axles connect the two sets of wheels.

A further object is to provide novel means for mounting the brakes of the wheels.

A still further object is to provide an improved type of connection between the truck and a draw bar, this connection being such as to prevent accident, even though the king bolt should break.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a top plan view of the improved truck;

Fig. 2 is a longitudinal sectional view cut on substantially a central plane;

Fig. 3 is a side elevation;

Fig. 4 is a bottom plan view partly in section; and

Figs. 5 and 6 are vertical transverse sections on the planes indicated by the lines 5—5 and 6—6 respectively of Fig. 1;

In the drawings above briefly described, the numeral 1 designates a horizontally disposed rectangular frame whose side bars 2 are provided near their ends with depending pairs of legs 3 between which the truck wheels 4 are mounted, each wheel having oppositely extending trunnions 5 mounted in suitable roller bearings or the like 6 carried by the aforesaid legs. By this arrangement, friction is reduced to the minimum and the wheels on opposite sides of the truck may turn independently in rounding curves.

Near its ends, the frame 1 is provided with pairs of transversely extending arched webs 7 which are joined at their ends to the side bars 2, the outermost web of each pair being joined to the end bars 9 of the frame 1 by central longitudinal webs 8, while other central longitudinal webs 9′ extend toward each other from the innermost of said pairs of webs 7 and carry a central bearing member 10. Other transverse webs 11 extend laterally in opposite directions from the bearing member 10 and are joined at their outer ends to the side bars 2. By the arrangement of webs shown and described, the frame 1 is effectively trussed and bearing 10 is so supported as to resist any weight resting thereon. It will be observed that the webs 7 are not only joined at their ends to the side bars 2, but to the innermost legs 3 which depend therefrom, said webs thus serving to rigidly brace these legs against possible lateral tilting. The arched webs 7 also perform the highly important function of carrying depending posts 12 upon which horizontally swinging levers 13 of the brakes are mounted, the upper ends of said posts being located between the webs of each pair and joined thereto as shown in the drawings.

Oppositely extending links 14 are pivoted to the levers 13 on opposite sides of their fulcrums, said links being similarly connected to transverse brake beams 15 carrying the usual brake shoes 16. A longitudinal bar 17 connects the two levers 13 for operation in unison and a vertical lever 18 is connected to and rises from one end of said bar 17. A longitudinal link 19 connects the upper end of lever 18 with a horizontal lever 20 fulcrumed on the upper end of one of the posts 12 and a brake rod 21 leads from said lever 20 for actuating the same. The arrangement of the brakes is comparatively simple, yet it will be obvious that they will all be equally applied when the rod 21 is pulled upon by the usual or any preferred means. It has been found that the best results are obtained when the levers 13 are fulcrumed to the lower ends of posts such as 12 and the provision of these posts and their mounting means, therefore forms a highly important feature of the present invention.

Another rather salient feature is the coaction of the bearing member 10 with a second bearing member 22 in the form of a socket seen most clearly in Fig. 2. The lower end of this socket receives therein the upper end of the bearing member 10 and a king bolt 23 passes through the two, but even though this bolt should break, the fitting of the one member into the other will prevent accident, and will permit the draw-bar 24 which is attached to the member 22, to operate as usual. Ball bearings or the like 25 are by preference interposed between the two members 10 and 22 to reduce friction to the minimum.

The upper side of the bearing member 22 is by preference formed with front and rear parallel flanges 26 between which the usual transverse beam 27 for attachment to the car body is secured, the ends of said beam resting on anti-friction rollers 28 carried by the centers of longitudinal semi-elliptic springs 29, the latter being mounted on the upper sides of the bars 2 of frame 1. As the truck turns in rounding curves, the rollers 28 roll upon the beam 27 and it will be obvious that the springs 29 will permit the necessary side sway of the car body.

Preferably employed in connection with the features of construction above described, are depending longitudinal flanges 30 formed on the side bars 2 and extending between the legs 3, other similar flanges 31 being provided to extend from the legs 3 to end flanges 32 depending from the end bars 9. The usual links 33 which support the ends of the brake beams 15 are pivoted at their upper ends between the flanges 30 and 31 as shown clearly in Figs. 3 and 6.

In addition to the above, longitudinal bars 37 by preference extend between and are secured to the lower ends of the legs 3 to increase the rigidity of said legs so that they may effectively withstand the necessary strain.

From the foregoing, taken in connection with the accompanying drawings, it will be obvious that although my invention is of comparatively simple and inexpensive nature, it will be highly efficient and durable. Since probably the best results are obtained from the several details shown and described, they are preferably followed, but within the scope of the invention as claimed, considerable latitude is allowed for making any minor changes which occasion may dictate.

I claim:

1. A car truck comprising a wheeled frame having vertical posts near its front and rear ends on which brake equipment is adapted to be mounted, and webs securing said posts to said frame.

2. A car truck comprising a wheeled horizontal frame, a central bearing for connecting said frame to the car body, a pair of vertical posts disposed between said bearing and the ends of the frame and adapted to carry brake equipment, and webs securing said posts and bearing to said frame.

3. A car truck comprising a horizontal frame, pairs of legs depending from the sides of said frame near its ends, and wheels mounted between said legs; transverse arched webs extending from the inner legs at one side of the frame to those at the other side thereof, and vertical posts joined to and depending centrally from said webs to carry brake equipment.

4. A car truck comprising a horizontal frame, pairs of legs depending from the sides of said frame near its ends, and wheels mounted between said legs; transverse arched webs extending from the inner legs at one side of the frame to those at the other side thereof, vertical posts joined to and depending centrally from said webs to carry brake equipment, a central bearing in said frame for connecting the car body thereto, transverse webs extending from said bearing to the sides of said frame, longitudinal webs extending from said bearing to said arched webs, and other longitudinal webs extending from said arched webs to the ends of said frame.

In testimony whereof I have hereunto set my hand.

CHANCELOR SIMEON ETHRIDGE.

Witnesses:
 DANIEL D. ATWOOD,
 ELMER B. HART.